(12) United States Patent
Miyamoto et al.

(10) Patent No.: US 6,390,693 B1
(45) Date of Patent: *May 21, 2002

(54) INTERCHANGEABLE LENS CAMERA HAVING MOVABLE LENS BARREL

(75) Inventors: Hidenori Miyamoto, Urayasu; Yuji Katano, Kawasaki, both of (JP)

(73) Assignee: Nikon Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/345,503

(22) Filed: Jul. 1, 1999

Related U.S. Application Data

(63) Continuation of application No. 08/686,361, filed on Jul. 25, 1996.

(30) Foreign Application Priority Data

Jul. 25, 1995 (JP) .............................................. 7-189059

(51) Int. Cl.[7] .......................... G03B 17/00; G03B 17/04
(52) U.S. Cl. ......................... 396/529; 396/75; 396/348
(58) Field of Search ................................ 396/535, 532, 396/348, 529, 87, 85, 71, 75

(56) References Cited

U.S. PATENT DOCUMENTS

| | | | | |
|---|---|---|---|---|
| 4,118,713 A | * | 10/1978 | Murakami et al. | 396/529 |
| 4,400,075 A | * | 8/1983 | Tomori et al. | 396/529 |
| 4,437,752 A | * | 3/1984 | Akashi et al. | 396/535 |
| 4,958,178 A | | 9/1990 | Yoshida et al. | 354/195.12 |
| 5,241,422 A | | 8/1993 | Shimada et al. | 359/694 |
| 5,471,100 A | | 11/1995 | Sakamoto et al. | 310/12 |
| 5,489,958 A | | 2/1996 | Katagiri et al. | 354/195.12 |
| 5,526,188 A | | 6/1996 | Kanno et al. | 359/698 |
| 5,655,171 A | | 8/1997 | Machida et al. | 396/535 |
| 5,678,096 A | | 10/1997 | Wakabayashi et al. | 396/348 |

FOREIGN PATENT DOCUMENTS

JP 56-91224 10/1981

OTHER PUBLICATIONS

U.S. application No. 08/686,361, Miyamoto et al., filed Jul. 25, 1996.

* cited by examiner

*Primary Examiner*—Christopher E. Mahoney

(57) ABSTRACT

An interchangeable lens camera including a lens barrel and a camera body. The lens barrel is attached to the camera body via a body side mount and a lens side mount. The lens barrel mounting mechanism, including the body side mount and the lens side mount, is capable of moving along the optical axis of the camera so as to move from a position where the lens barrel is completely collapsed within the camera body to a position where the lens barrel is fully extended for zoom photography. The shortest state of the camera is when the lens barrel is detached from the camera. The lens barrel includes a set tube that is movable along the optical axis, lens units for focusing light onto a film in the camera body, and lens protection elements that open or close depending upon the state of the lens barrel, i.e., detached or attached, collapsed or extended. The camera body includes a control circuit that controls the movement of the lens barrel based upon the state of several switches, some of which are located in the lens barrel.

12 Claims, 13 Drawing Sheets

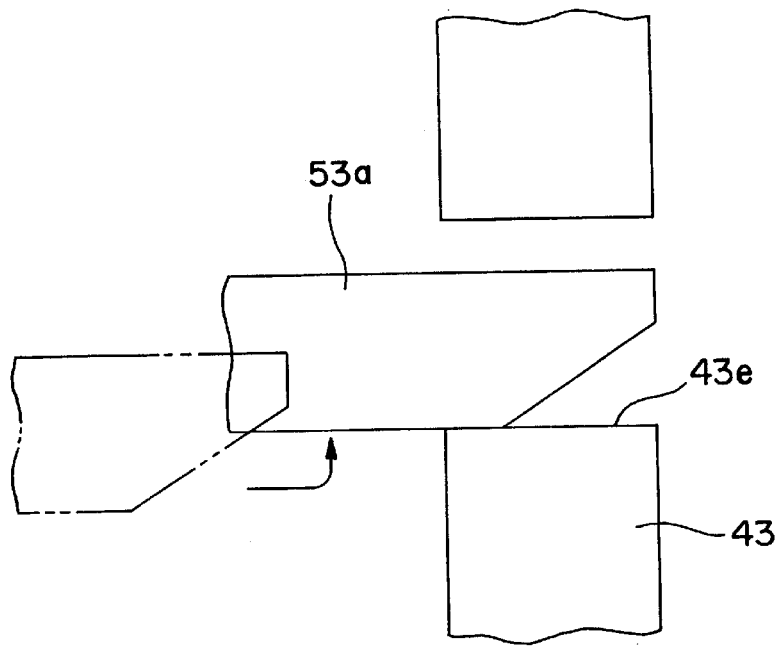
FIG. 12
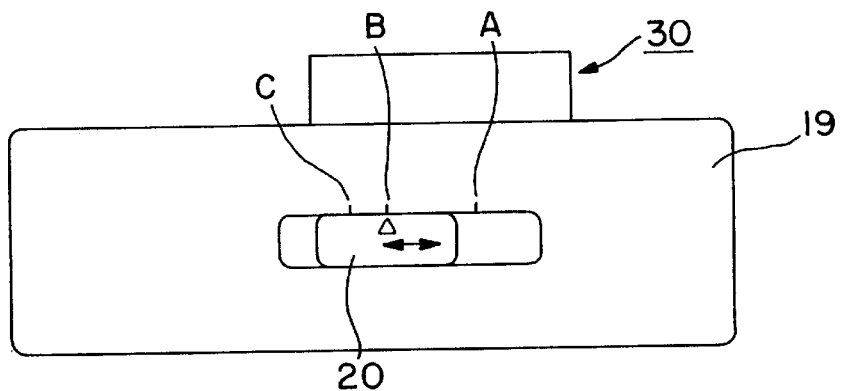
FIG. 14a
| POSITION<br>SWITCH | C | B | A |
|---|---|---|---|
| SW1 | L | L | H |
| SW2 | H | L | L |
FIG. 14b

INTERCHANGEABLE LENS CAMERA HAVING MOVABLE LENS BARREL

CROSS REFERENCE TO RELATED APPLICATIONS

This application is a continuation of Ser. No. 08/686,361 filed Jul. 25, 1996, abandoned.

This application is based upon and claims priority from Japanese Patent Application No. 07-189059 filed Jul. 25, 1995, the contents of which are incorporated herein by reference.

BACKGROUND OF THE INVENTION

1. Field of the Invention

The present invention relates to an interchangeable lens camera with a lens barrel detachably disposed in a camera body, and in particular, it relates to a mounting device for a lens barrel in an interchangeable lens camera which can detachably mount, and in addition cause to collapse, the interchangeable lens barrel in the camera body.

2. Description of the Related Art

In interchangeable lens cameras, generally, the lens barrel is mounted to be freely detachable with respect to the camera body. A screw-in type lens barrel attached by a screw mount is known as is a detachably spring-mounted type lens barrel attached by a bayonet mount.

Namely, in the screw-in type lens barrel, the structure was such that screw portions were disposed on the lens receiving aperture portion of the camera body and the rear end side of the lens barrel. The lens barrel (interchangeable lens) was caused to rotate by causing both screw portions to engage and be joined, and thus, it was freely detachable with respect to the camera body.

In the spring-mounted type lens barrel, the structure was such that the lens barrel, by causing rotary movement in a predetermined angular direction with respect to the camera body, was also freely detachably mounted.

In interchangeable lens cameras with such an interchangeable type lens barrel that is freely detachably mounted in the camera body, a small size, light weight design is also known in which the lens barrel collapses within the camera body. For example, such a camera is disclosed in Japanese Laid-Open Patent Publication JPA-56-91224.

In this interchangeable lens camera, the lens barrel is freely detachably disposed in a mounting unit on the front surface side of the camera body. Also, this lens barrel is formed so as to move back and forth along the optical axis direction with respect to this mounting unit. In this camera, in order to make the lens barrel capable of extension within the camera body, a lens type shutter is adopted. In addition, in the forward direction of the film surface within the camera body, when movement of the lens barrel lead to removal thereof, for example opening and closing by coupling the lens barrel during rotation of a bayonet coupling, a screening plate device is disposed to screen off the light path towards the film surface.

Then, the construction was to cause collapsing, causing this screening plate device to pass through, leaving this screening plate device open, coupling by rotary movement during mounting of the lens barrel to the camera body, and also to cause the lens barrel to move extending on the film surface side along the optical axis direction.

However, in the above interchangeable lens cameras, the mounting member of the lens barrel had to be formed in the outer circumferential portion of the lens barrel which was the front surface portion of the camera body. In particular, not only did it become a hindrance to obtain a good external appearance, but the drive mechanism of the lens barrel became unnecessarily large due to the fact that the mounting member was larger than the diameter of the lens barrel. As a result, this construction has become an obstacle to miniaturization.

Because of this, it was desirable to adopt measures for improving the mounting unit structure for the camera body side, making the lens barrel freely detachably interchangeable, thus bringing about an improvement in the external appearance of the camera, and in addition, allowing the camera to be designed with a smaller size.

For example, in a known detachable lens camera, it is known for the mounting unit of the lens barrel to be movable back and forth in the optical axis direction within the camera body. However, such a camera causes a photographic lens focusing action by movement in the optical axis direction while rotating the mounting unit itself, thus requiring a special mechanism in order to cause the lens barrel to move in the optical axis direction. This requirement complicates the structure.

Moreover, in such a structure, the external appearance was excellent when the mounting unit of the lens barrel was assembled in the camera body. However, because the mounting unit itself rotated when moving in the optical axis direction, there was a problem that the transmission of motive power or the transmission of electrical signals between the camera body and the lens barrel was difficult. The problem had to be taken into account for improving the mounting unit structure.

SUMMARY OF THE INVENTION

Accordingly, it is an object of the present invention to overcome the above problems of the above known cameras.

It is also an object of the present invention to obtain an interchangeable lens camera which is designed for a small-sized camera body, and which can simply and accurately mount a lens barrel to a camera body.

Furthermore, another object of the present invention is to provide an interchangeable lens camera having a lens barrel that can collapse within the camera body by a movement along the optical axis direction, without limitation to the external appearance of the camera.

Objects of the present invention are achieved by an interchangeable lens camera comprising a mounting device for interchangeably mounting a lens barrel on a camera body, the mounting device being disposed to prevent rotation about an optical axis and to move back and forth in an optical axis direction, and the mounting device, by moving in the optical axis direction, receiving the lens barrel in the camera body.

Still further objects of the present invention are achieved by an interchangeable lens camera comprising a camera body, a lens barrel with focusing lenses, a first mounting device disposed in the lens barrel, and a second mounting device disposed in the camera body, wherein the first and second mounting devices act to mount the lens barrel to the camera body and to electrically and mechanically connect the lens barrel and the camera body, and wherein the lens barrel is movable along an optical axis of the focusing lenses so as to be movable from a first fully collapsed position where the lens barrel is fully collapsed within the camera body to a second fully extended telephoto position.

Objects of the present invention are also achieved by an interchangeable lens camera wherein a lens barrel mounting device is prevented from rotating around the optical axis within the camera body, and is movable in the optical axis direction. When the lens barrel is in a state in which it has moved as far as an extended position in the camera body, in this state a retracting movement of the mounting device is caused by movement back and forth in the camera body. An electrical drive member of a lens barrel side and a control circuit of the camera body side are electrically connected by causing the mounting device to move as far as the collapsed position.

Moreover, objects of the present invention are also achieved by an interchangeable lens camera which allows the lens barrel mounting device to move linearly as far as an extended position along the optical axis direction within the camera body. Also, the shortest length of the camera is when the lens barrel is detached from the camera body.

Furthermore, at the time of removal of the lens barrel from the camera body, a lens protection member, which opens and closes a photographic optical path at the front surface side of the lens barrel, is closed.

The lens barrel mounting device is for example constituted by a body side mount and a lens side mount. Moreover, the back and forth movement, for example, is accomplished by a set tube. Furthermore, the electrical mechanism units on the camera body side are, for example, a control circuit or units connected to the control circuit, motors used for focus drive, and a zooming motor. As mechanical mechanism units, there are, for example, coupling gears for use in zoom driving.

Moreover, a shutter and a focusing drive unit, which are connected via an electrical transmission device by connection pins and the like formed of electrically conductive materials, serve as the electrical drive members within the lens barrel. Furthermore, the lens protection member, for example, is formed of a light shielding plate disposed in an aperture portion of the camera body.

BRIEF DESCRIPTION OF THE DRAWINGS

These and other objects, features, and characteristics of the present invention, along with methods of operation and manufacture, will become apparent to one skilled in the art from a study of the following detailed description and the appended claims and drawings, all of which form a part of this specification. In the drawings:

FIGS. 7a and 7b are schematic diagrams showing the relationship of a phase of a cam groove of a set tube in the lens barrel and an inclined cam surface of the detachment knob, wherein FIG. 7a is an oblique diagram of the set tube, and FIG. 7b is an oblique diagram of the inclined cam surface;

FIG. 12 is a diagram showing the relationship of engagement portions, which are disposed in a lens side mount and a leg in order to cause opening and closing action of a barrier in the barrier opening and closing mechanism of FIG. 8, in an interchangeable lens camera according to a preferred embodiment of the present invention;

FIGS. 13a–13c are diagrams showing the relationship of a zoom position detection switch in the lens barrel in an interchangeable lens camera according to a preferred embodiment of the present invention, wherein FIG. 13a shows the collapsed state, FIG. 13b shows the state at the Wide end, and FIG. 13c shows the state at the Tele end;

FIG. 14a is a bottom view of an interchangeable lens camera according to a preferred embodiment of the present invention showing the detachment knob which acts jointly as a power supply switch;

FIG. 14b is a table showing the relationship between positions shown in FIG. 14a and the state of switches SW1 and SW2 in the interchangeable lens camera according to a preferred embodiment of the present invention.

DETAILED DESCRIPTION OF THE PREFERRED EMBODIMENTS

Figure 1:
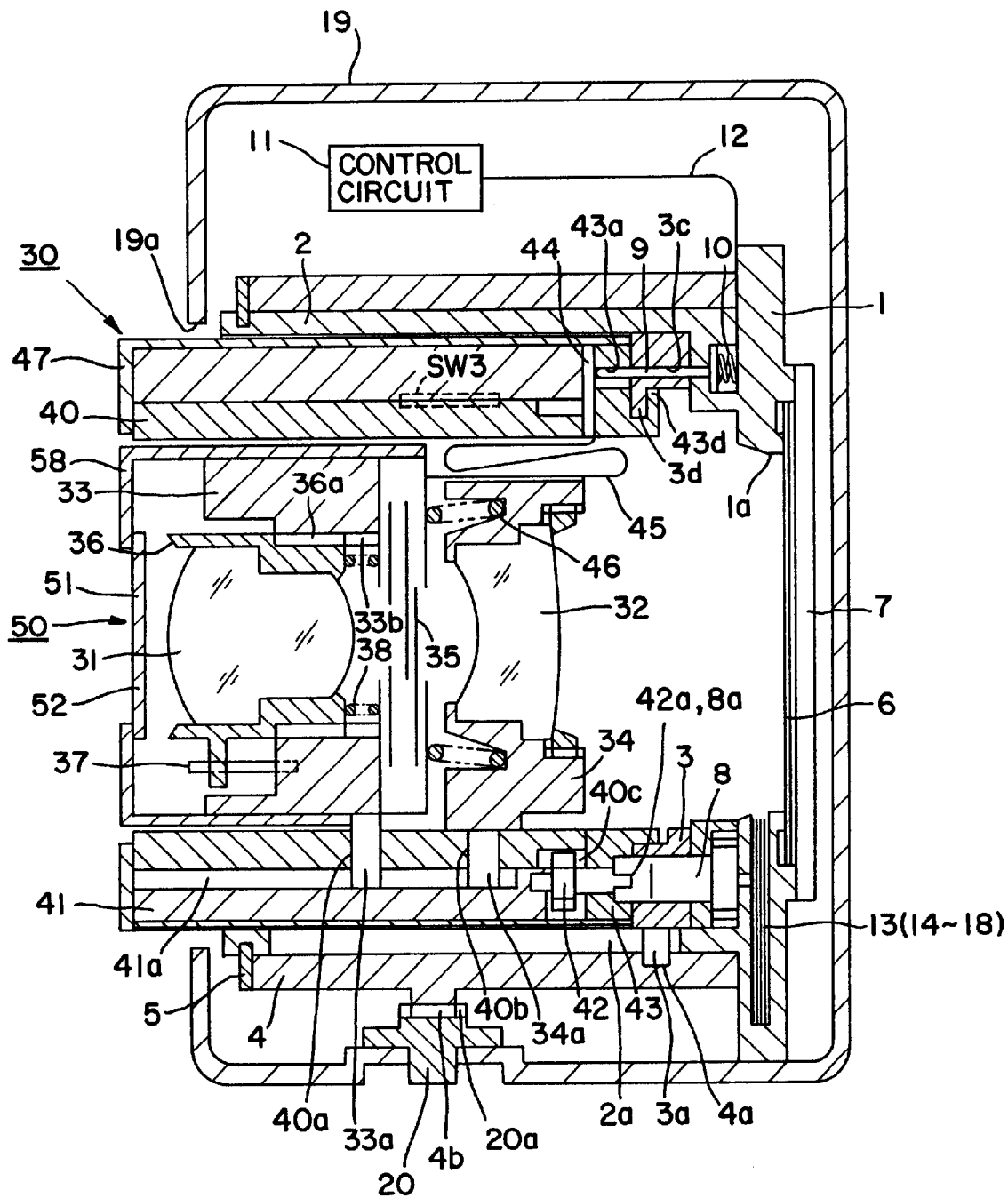
FIG. 1 is a schematic cross sectional diagram showing a camera according to a preferred embodiment of the present invention in a state with a lens barrel received within a camera body.
Figure 2:
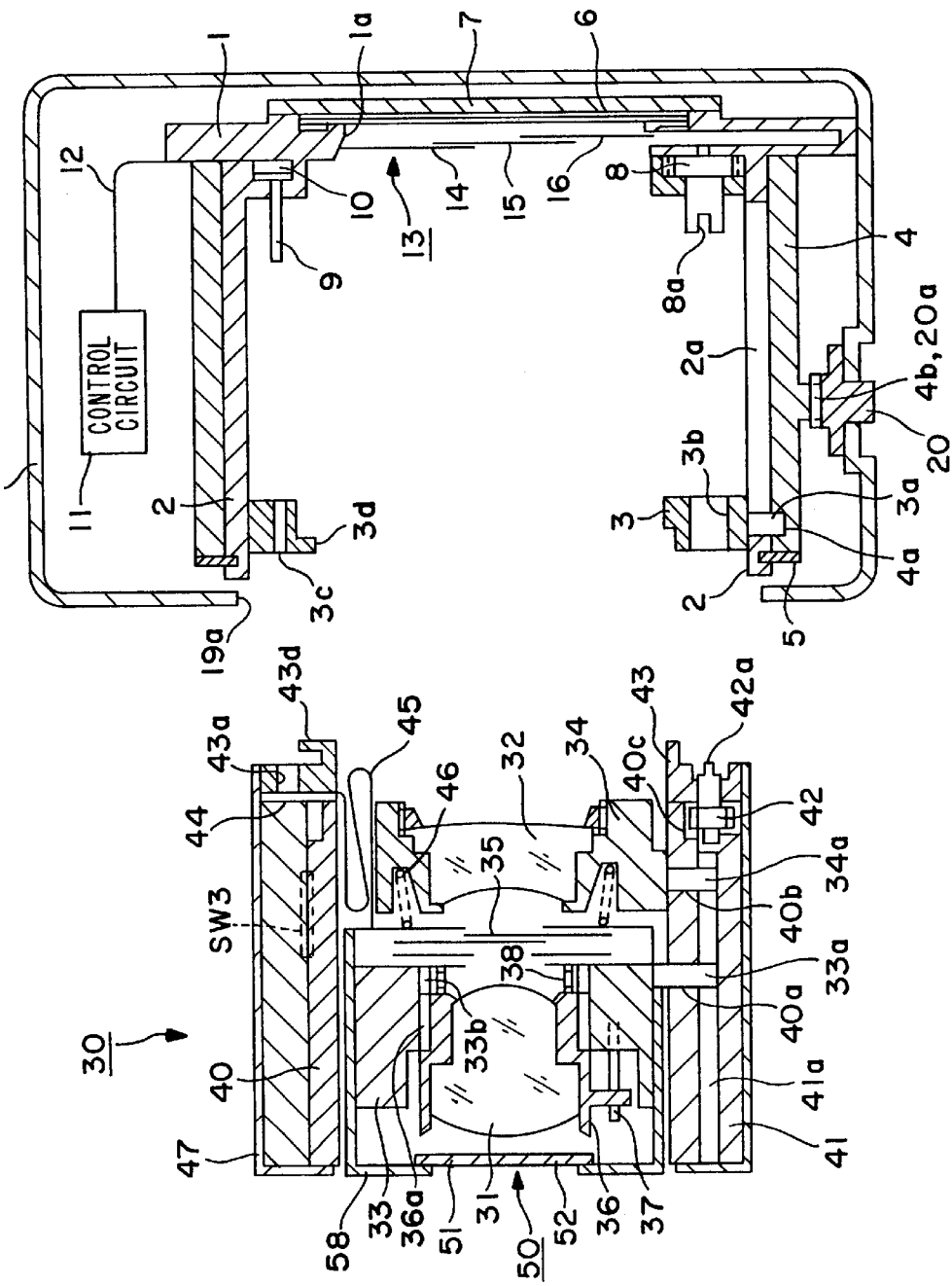
FIG. 2 is a schematic cross sectional diagram showing a camera according to a preferred embodiment of the present invention in a state with the lens barrel removed from the camera body.
Figure 3:
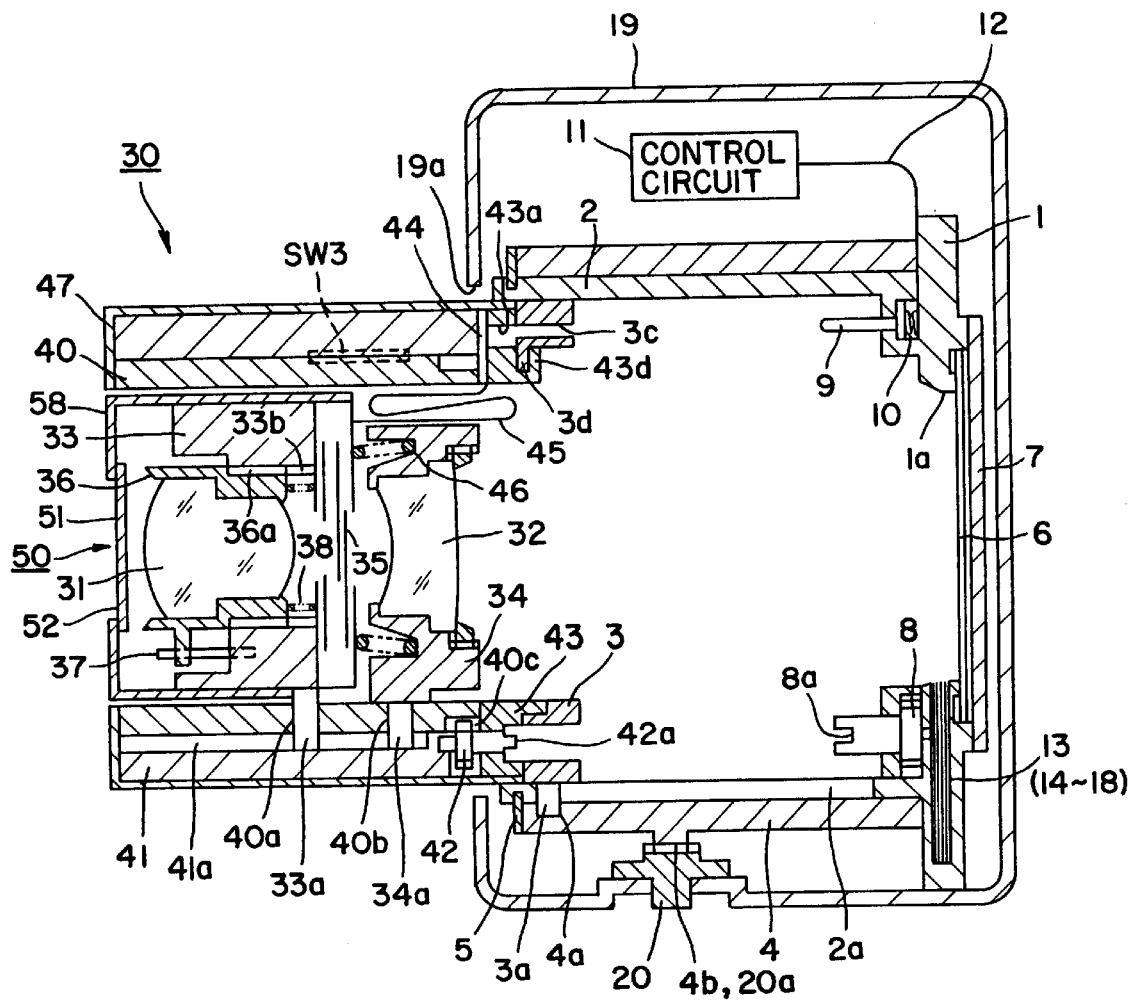
FIG. 3 is a schematic cross sectional diagram showing a camera according to a preferred embodiment of the present invention in a state with the lens barrel mounted by a rotar, bayonet coupling in the camera body.
Figure 4:
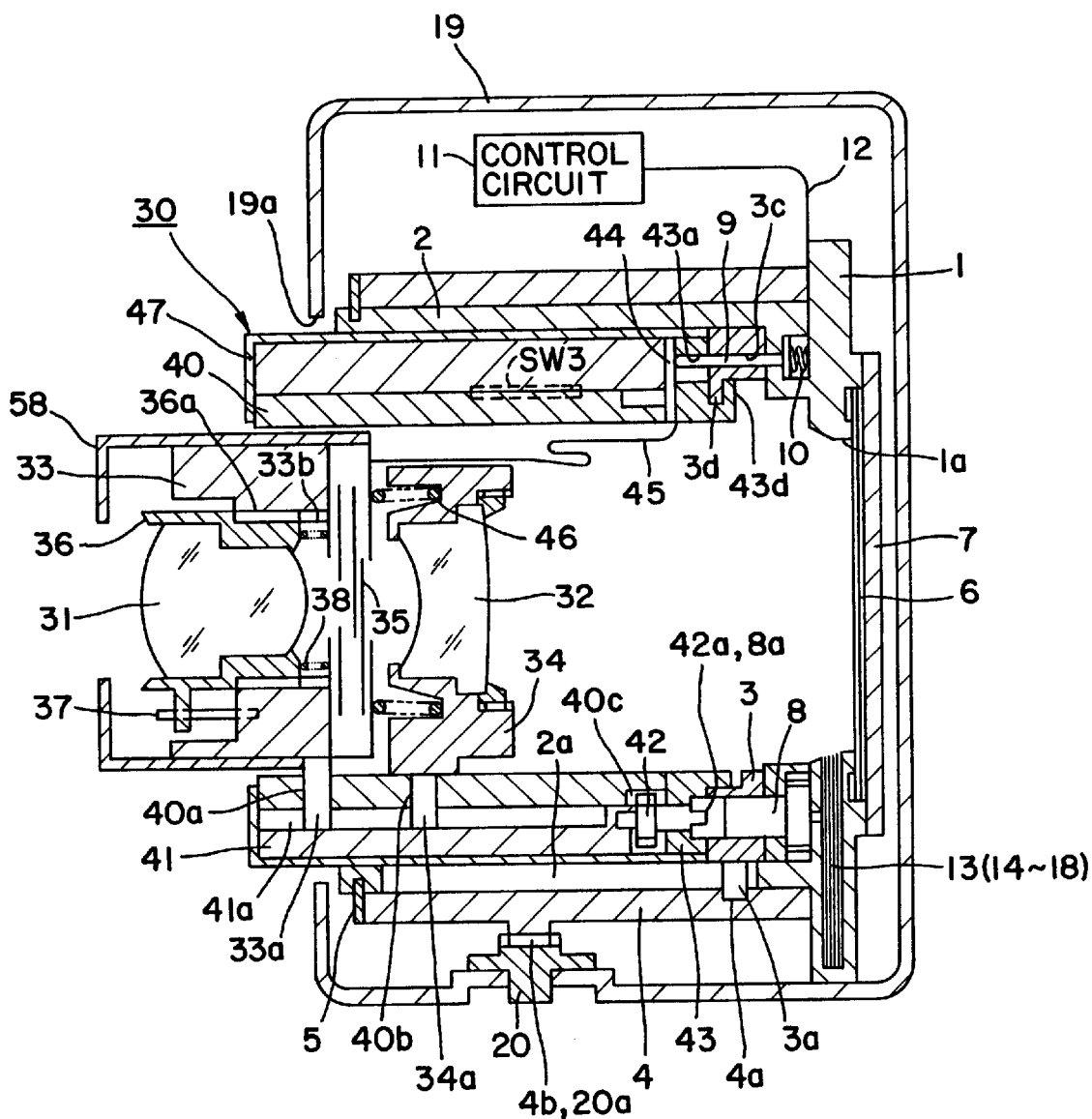
FIG. 4 is another schematic cross sectional diagram showing a camera according to a preferred embodiment of the present invention in a state with the lens barrel mounted by a rotary bayonet coupling in the camera body.

FIGS. 1–4 show the configuration of a preferred embodiment of an interchangeable lens camera according to the present invention. In these Figures, FIG. 1 shows the state in which the interchangeable type lens barrel is received within a camera body. FIG. 2 shows the state in which the interchangeable lens barrel is extended from the camera body. FIG. 3 shows the state at the time at which the same interchangeable type of lens barrel, mounted by a generally widely known bayonet coupling of the camera body side, is caused to rotate. FIG. 4 shows the state when zooming has operated from the state of FIG. 1.

In these Figures, camera body 1, of which only a portion is shown in the Figures, has an integral guide tube 2 which constitutes a lens barrel holding unit set in the optical axis direction in the camera central portion. A guide groove 2a is formed along the optical axis direction in a portion of a guide tube 2. The guide groove 2a is such as to guide only in the optical axis direction a follower pin 3a of a mount 3 on the camera body side which constitutes a mounting device of the lens barrel disposed freely moveable along the optical axis direction in the internal circumference of the guide tube 2.

Set tube 4, fitted for free rotation on the outer circumference of the guide tube 2, is disposed such that movement in the optical axis direction is regulated by a fixed ring 5. A cam groove 4a is formed in the inner circumference of this set tube 4, connected via the guide groove 2a with the end of the follower pin 3a. This cam groove 4a, for example as shown in FIG. 7a, in the inner circumference of set tube 4 in the optical axis direction, is formed with a portion having a predetermined inclination and a portion at right angles to the optical axis.

Then, by use of the engagement of the guide groove 2a with the follower pin 3a and cam groove 4a, the follower pin 3a moves along the cam groove 4a, extending and retracting in the optical axis direction.

Aperture 1a denotes an aperture portion formed in a center portion back surface side of the camera body 1. Film 6 is a photosensitive material which travels along a film travel path of this back surface side. Pressure plate 7 supports the back surface side of the film 6.

Coupling gear 8 is used in zoom driving, and is a mechanical unit disposed in the camera body side, which has been located in a portion of the back surface side of the body side mount 3 by the rim portion of the aperture portion 1a. Coupling gear 8 is in gear engagement with an electric motor (not shown in the drawing), and is constructed to transmit the rotational force of this motor to a cam tube (described hereinafter) of a lens barrel 30. A coupling side end 8a of the lens barrel side of the coupling gear 8 connects into a hole portion 3b (FIG. 2), which is formed in the camera body side mount 3. Coupling gear 8 is constructed so as to perform rotational transmission, in engagement with a coupling gear 42 (described hereinafter) of the lens barrel side.

Connecting pin 9 is formed of an electrically conductive material and comprises an electrical transmission circuit that performs transmission of electrical control signals between the camera body 1 and the lens barrel 30. The connecting pin 9 is located in a position which has been displaced in the circumferential direction with respect to the coupling gear 8, and is used for zoom driving of the body side. The connecting pin 9 is formed so as to perform electrical connection with a lens side mount (described hereinafter) of the lens barrel. The end of pin 9 penetrates a hole portion 3c formed in the body side mount 3. Moreover, the base end portion of connecting pin 9 connects to an electrically conductive spring 10. Pin 9 is connected via this electrically conductive spring 10 to a control circuit 11 disposed at a suitable position within the camera body cover 19 by a flexible printed wiring board 12.

Light screening device 13 is disposed facing the peripheral portion of the aperture portion 1a of the camera body 1. Details of this structure are shown in FIGS. 5 and 6.

As shown in FIG. 2, plural light screening plates 14, 15, 16 (three plates in this embodiment), moveable to open and closed positions, have been located in front of the aperture 1a in order to screen light from the film 6. These screening plates 14, 15, 16 are respectively actuated in an up and down direction in the Figures, accompanying the ring motion of opening and closing legs 17, 18 (FIG. 5 et seq.). Opening and closing legs 17 and 18 form two parallel rings which are coupled to screening plates 14, 15, and 16 via pivots 14a, 15a, 16a, 14b, 15b, 16b, to open and close the aperture portion 1a. Moreover, in the Figures, pivot shafts 17a, 18a are connected to the camera body 1 side of the opening and closing legs 17, 18.

In this manner, the opening and closing of the screening device 13 is performed by a detachment knob 20 located for undisturbed sliding operation in the lower portion of the camera as shown in FIG. 1 and FIG. 14a. The detachment knob 20 is constructed as a sliding switch for undisturbed sliding operation in the camera bottom, namely the bottom portion of the camera body cover 19. Knob 20 also functions as a power supply switch knob which is the camera main switch.

Figure 5:
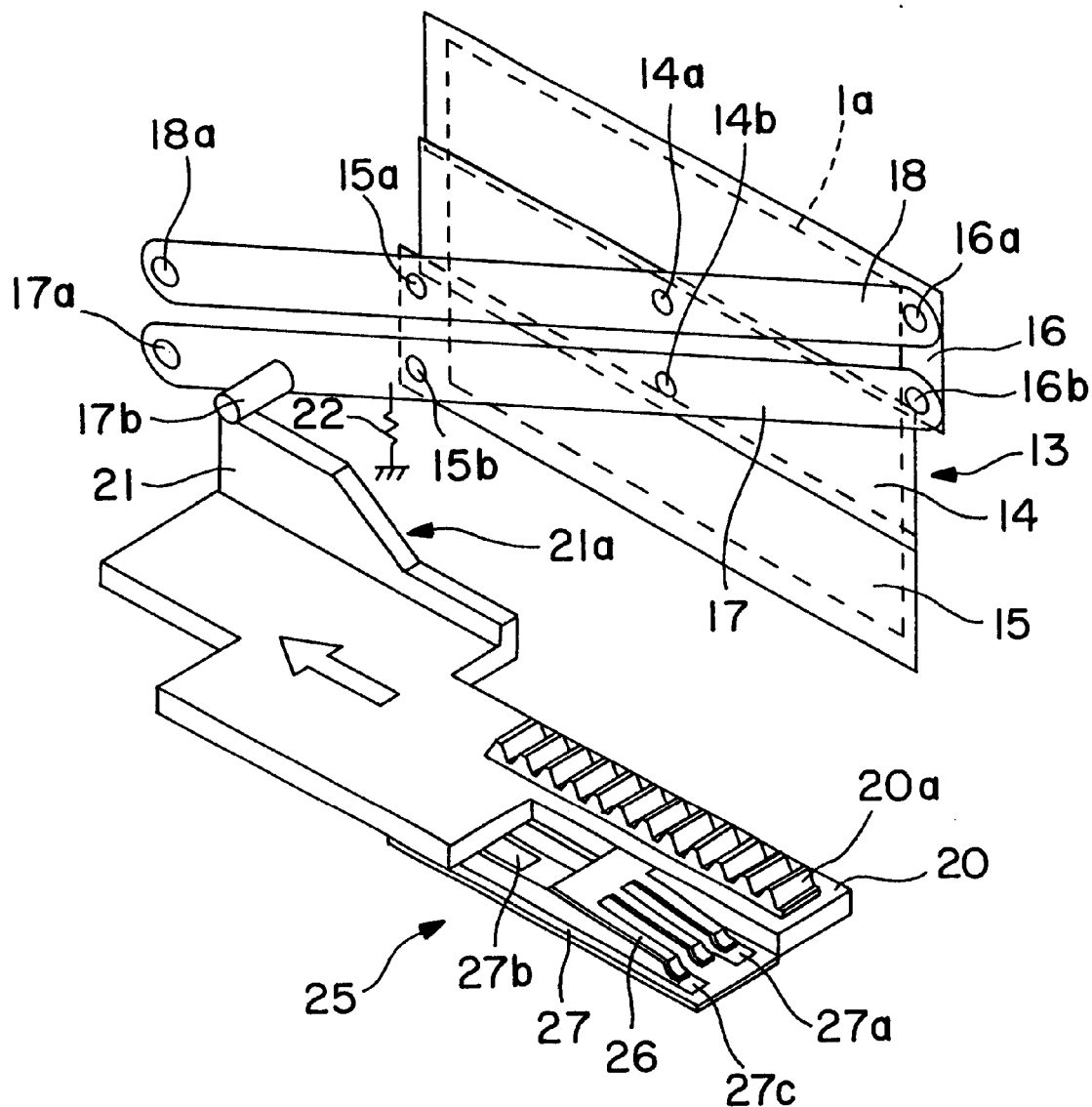
FIG. 5 is a schematic oblique diagram showing the relationship of a detachment knob of a lens, barrel and a light screening device, in the preferred embodiment of the present invention.
Figure 6:
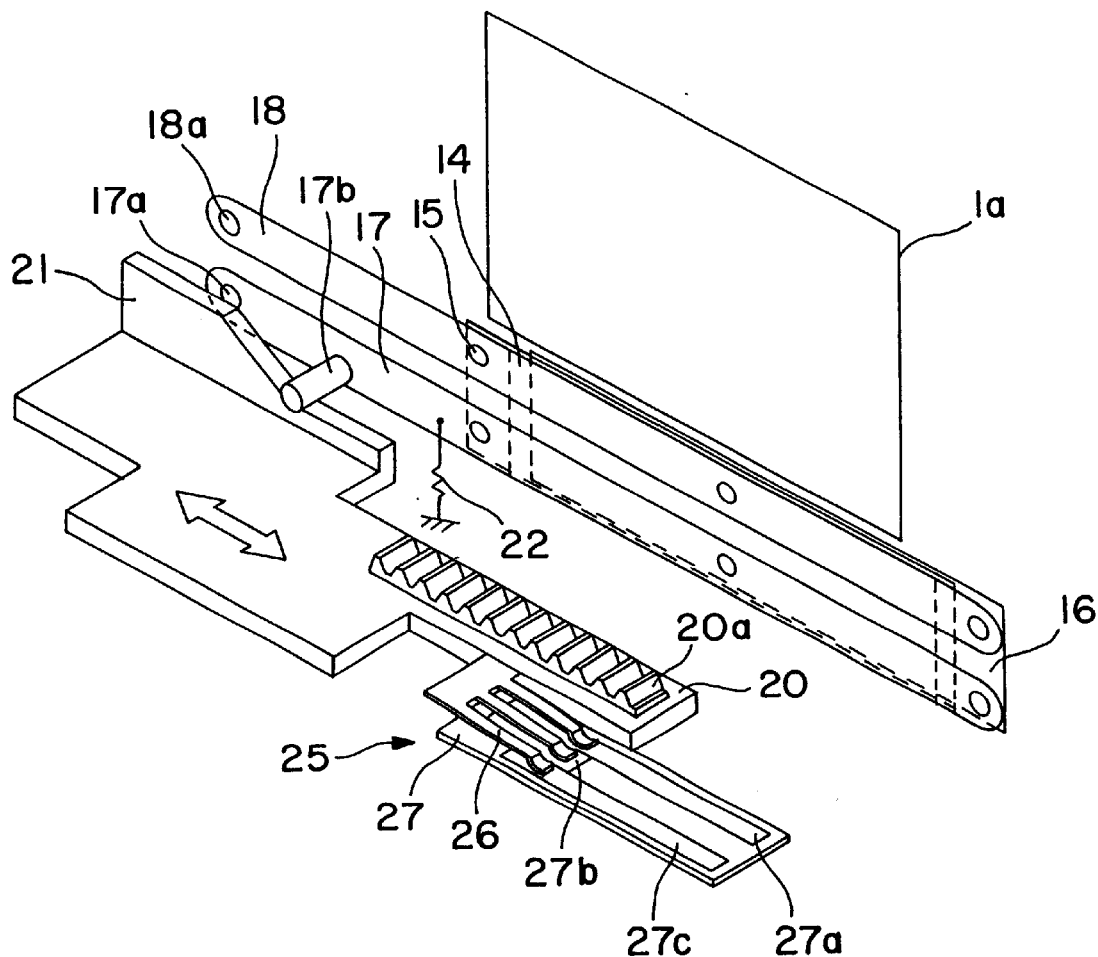
FIG. 6 is a schematic oblique diagram showing the state when, operating the detachment knob in the lens mounting position, the light screening device operates to open, in the preferred embodiment of the present invention.

With reference to FIGS. 1, 5 and 6, the detachment knob 20 has a support portion 21 which has an inclined cam surface 21a contacting a follower pin 17b disposed on the leg 17, which is one side of the opening and closing legs 17, 18. A tension spring 22 is then mounted to exert an urging force such that, in the opening and closing leg 17, the follower pin 17b is in a normally pressing contact state on the inclined cam surface 21a.

In such a construction, when the detachment knob 20 is moved, for example, in the direction of the arrow in FIG. 5, the follower pin 17b moves correspondingly along on the inclined cam surface 21a of the support portion 21 upper end, and rotates the opening and closing arms 17, 18. Due to this rotation, the light screening plates 14, 15, 16 move downward when the detachment knob 20 moves as far as the position shown in FIG. 6, and the aperture 1a opens.

Figure 7B:
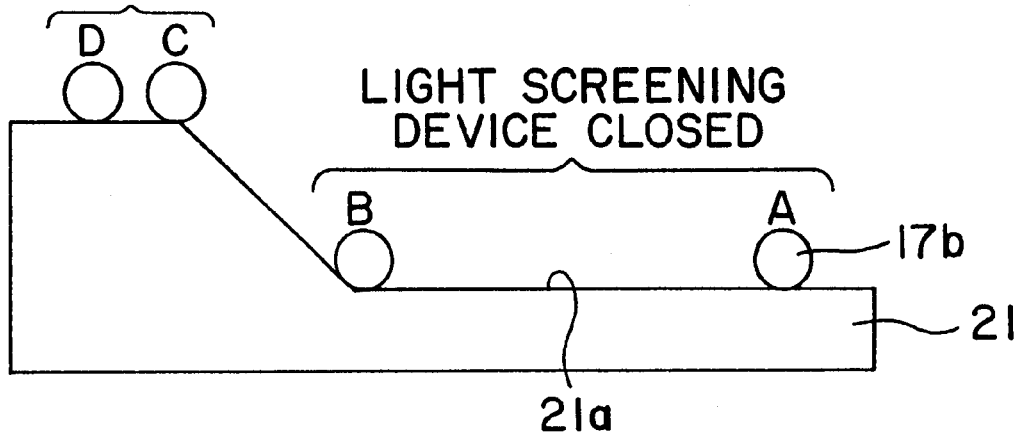
Figure 7A:
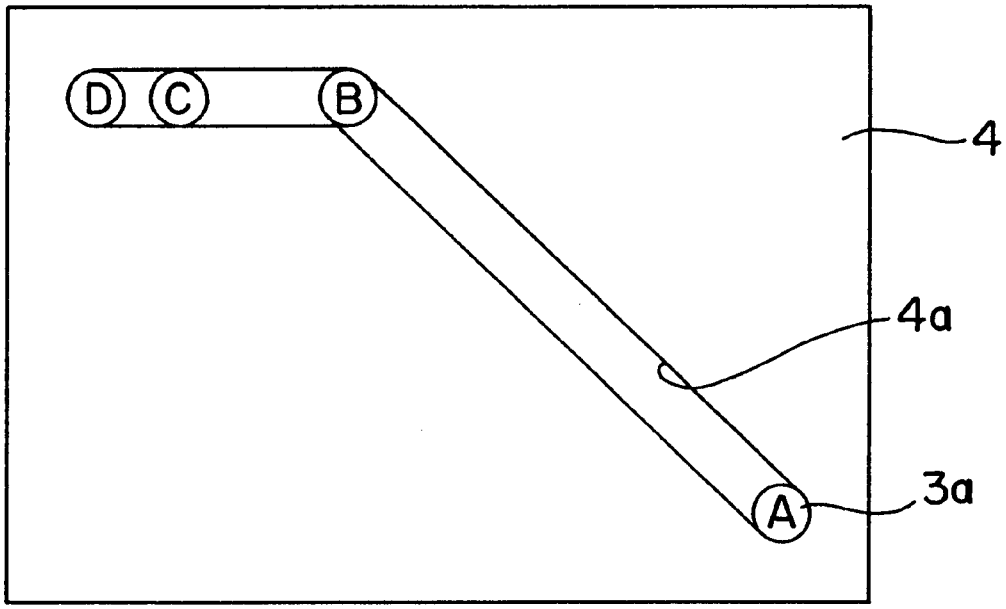

The motion of this follower pin 17b on the inclined cam surface 21a is shown in FIG. 7b. The light screening device 13 is in the closed state at the positions denoted by the symbols A, B, while the light screening device 13 is in the open state at the positions denoted by the symbols C, D. Namely, when mounting the lens barrel 30 in the camera body 1 at the position shown by the symbol A in FIG. 7b, the detachment knob 20 slides to the position D via the position C from the position B, the follower pin 17b engages the inclined cam surface 21a, and the light screening device 13 moves from the closed state to the open state.

At one side of the upper surface of the detachment knob 20, a rack 20a is formed along the left and right direction of the camera. Rack 20a is in toothed engagement with a gear 4b formed in a portion of the outer circumference of the set tube 4. Accordingly, if the set tube 4 is rotated, the rotation of the body side mount 3 around the optical axis is prevented. Movement in the optical axis direction can be actuated, and retraction of the lens barrel 30, as mentioned below, is possible along the optical axis direction into the body.

interchangeable lens barrel 30 is disposed retractably from an open aperture 19a of the front surface, center of the camera body cover 19 in the guide tube 2 of the camera body 1. The lens barrel 30 is disposed to be freely detachable with respect to the body side mount 3 which constitutes the mounting device movable in the optical axis direction within the guide tube 2.

Namely, lens barrel 30 is freely detachable with respect to the camera body 1, and also is constructed such that it can collapse and be received in the camera body 1, a so-called interchangeable lens type camera is used.

In lens barrel 30, first and second lens groups 31, 32, which form a zoom lens, are respectively disposed in a state supported by first and second group lens frames 33, 34, respectively. In the first lens group support frame 33, an actuator (not shown in the drawings) is built in. The actuator performs opening and closing of the back surface side shutter 35. In addition, a lens compartment member 36, which is assembled with the first lens group 31, causes rotation via a leg member 37, which has been disposed to protrude from a drive ring disposed in the interior of compartment member 36. Compartment member 36 is constructed by the threaded engagement of a male screw 36a, which was formed on the outer circumference of the compartment member 36, and a female screw 33b, which was formed in the first lens group frame 33. Focusing is performed by the extension and retraction of the first lens group 31.

Moreover, compression spring 38 prevents backlash between the male screw 36a and the female screw 33b by urging the lens compartment member 36 in one direction.

Lens barrel 30 has a cam tube 40 with cam grooves 40a, 40b, which engage a cam follower 33a of the first lens group support frame 33 and a cam follower 34a of the second lens group support frame 34.

Lens barrel 30 also includes fixed tube 41 located on the outer circumference of the cam tube 40. A guide groove 41a of the cam followers 33a, 34a is formed in cam tube 40, in the optical axis direction.

In the rear end of the fixed tube 41, a lens barrel side coupling gear 42 is shaft supported to rotate freely in engagement with a gear portion 40c which was formed in the rear end of the cam tube 40. In addition, a lens side mount 43 is disposed at the rear end of fixed tube 41.

In the lens side mount 43, corresponding to the body side mount 3, a connecting member is disposed which connects both lens side mount 43 and body side mount 3 when the lens barrel 30 has been mounted in the camera body 1. Namely, in the body side mount 3 and the lens side mount 43, there is a disengaged state in the assembly position at the time of assembly of the lens barrel 30, from which lens barrel 30 is assembled to contact and engage by making a predetermined angular rotation. Lens barrel 30 is equipped with a rotation restriction device (not shown in the drawing) which prevents pulling out of the lens barrel 30, and engagement claws 43d, 43d.

In the lens side mount 43, the shaft end portion 42a of the coupling gear 42 is disposed penetrating in a position opposite the hole portion 3b perforated in the body side mount 3. Then, as shown in FIG. 1, the shaft end portion 42a, at the time when the lens barrel 30 is mounted, engages the coupling side front end 8a of the body side coupling gear 8 so as to transmit rotation.

In the lens side mount 43, the hole portion 43a is formed in the portion corresponding to the hole portion 3c for use with the connecting pin 9 of the body side mount 3. A printed board 44 is interposed between this lens side mount 43 and the end of fixed tube 41 at the interior side of hole 43a, with a relay flexible printed board 45 being connected to the printed board 44 in order to perform electrical connection of the shutter 35. The drive member is also electrically connected via the printed boards 44 and 45, with the drive member performing focusing drive and being disposed within the lens barrel 30 with a body side control device. The relay flexible printed board 45 has a folded up portion such that lens groups 31, 32 may move for zooming action.

A conductive layer is formed on the surface which fronts on the lens side mount 43 of the printed board 45, and is exposed within the hole portion 43a. Then, at the time when the lens barrel 30 is mounted, the connecting pin 9 is inserted in this hole 43a. Via this connecting pin 9, by one end thereof coming into contact with the conductive layer, the lens barrel side 30 is connected via the flexible wiring board 12 to the control circuit 11.

As shown, for example, in FIG. 1, spring 46 prevents backlash of the cam followers 33a, 34a with respect to the cam grooves 40a, 40b by urging the second lens group support frame 34 in one direction.

Lens barrel outside cover 47 forms the outer shell of the lens barrel 30 and supports the cam tube 40 for free rotation in the fixed tube 41.

Figure 8:
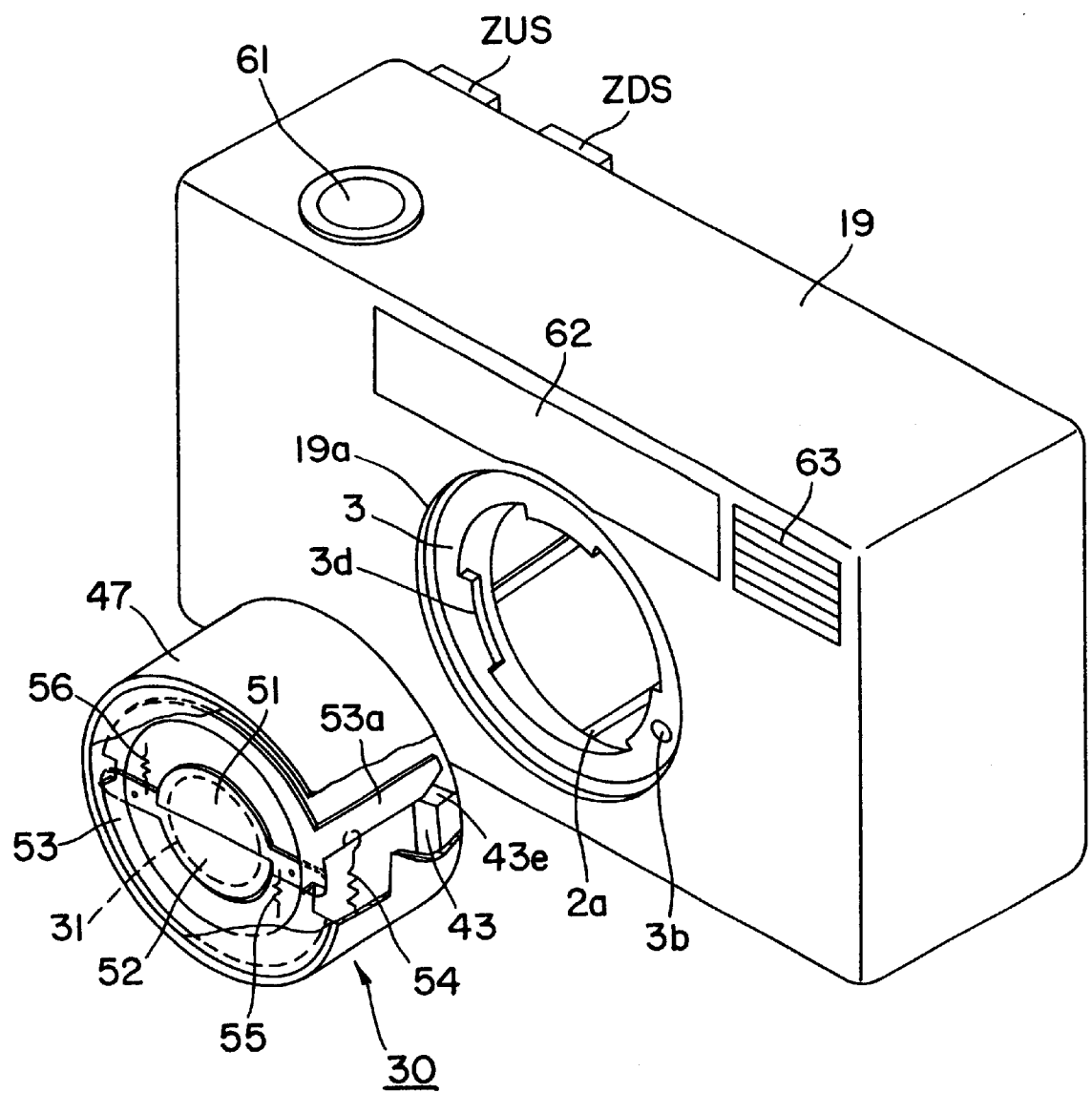
FIG. 8 is a perspective oblique view, partially cut away, illustrating the movement of a barrier opening and closing mechanism disposed in the lens barrel in an interchangeable lens camera according to a preferred embodiment of the present invention.
Figure 9:
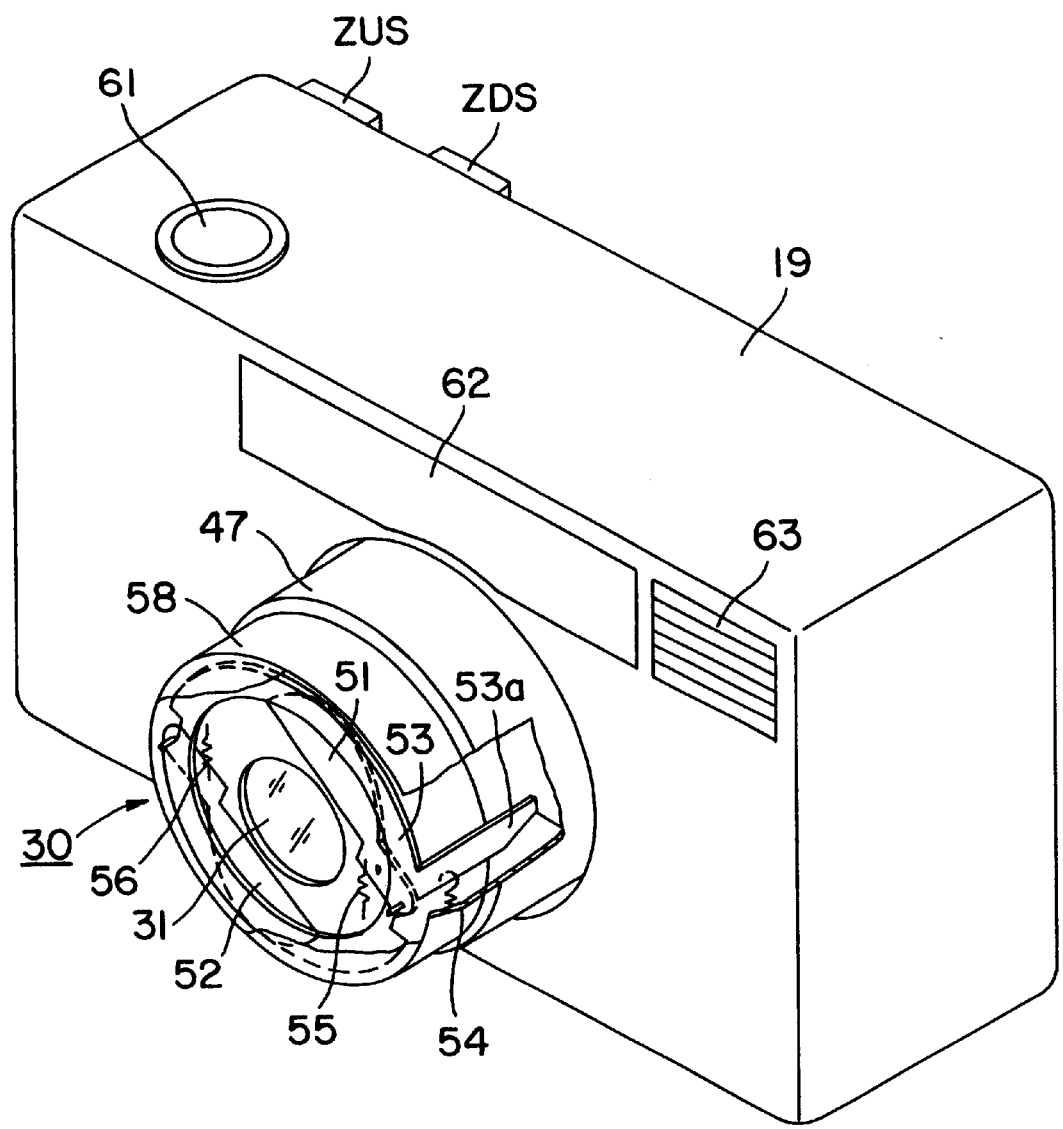
FIG. 9 is a perspective oblique view showing the state when the barrier opening and closing mechanism mounted on the lens barrel is opened, in an interchangeable lens camera according to a preferred embodiment of the present invention.
Figure 10:
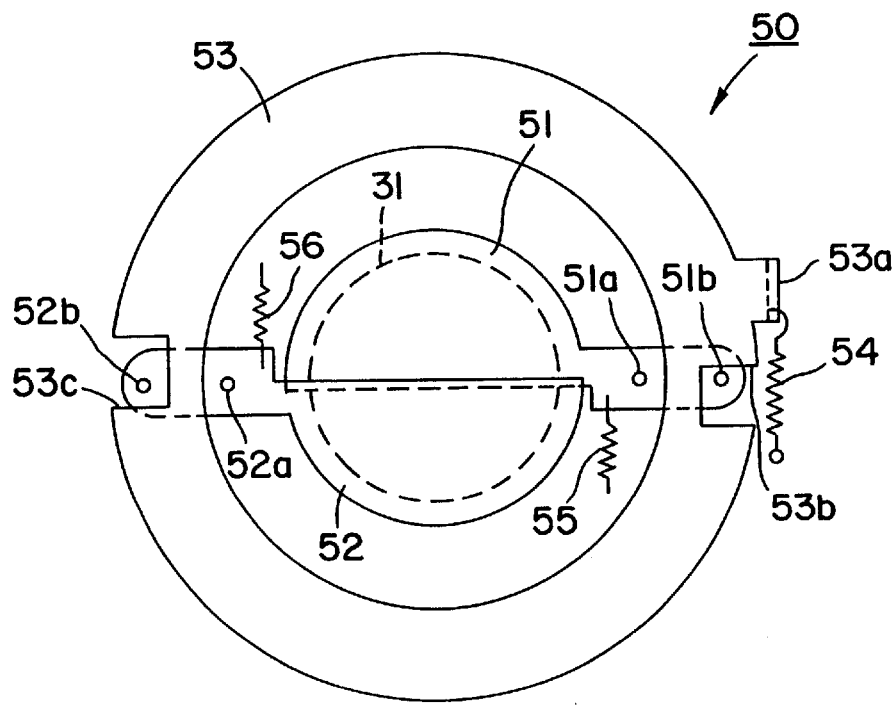
FIG. 10 is a cross sectional view showing the barrier opening and closing mechanism of FIG. 8, enlarged, in an interchangeable lens camera according to a preferred embodiment of the present invention.
Figure 11:
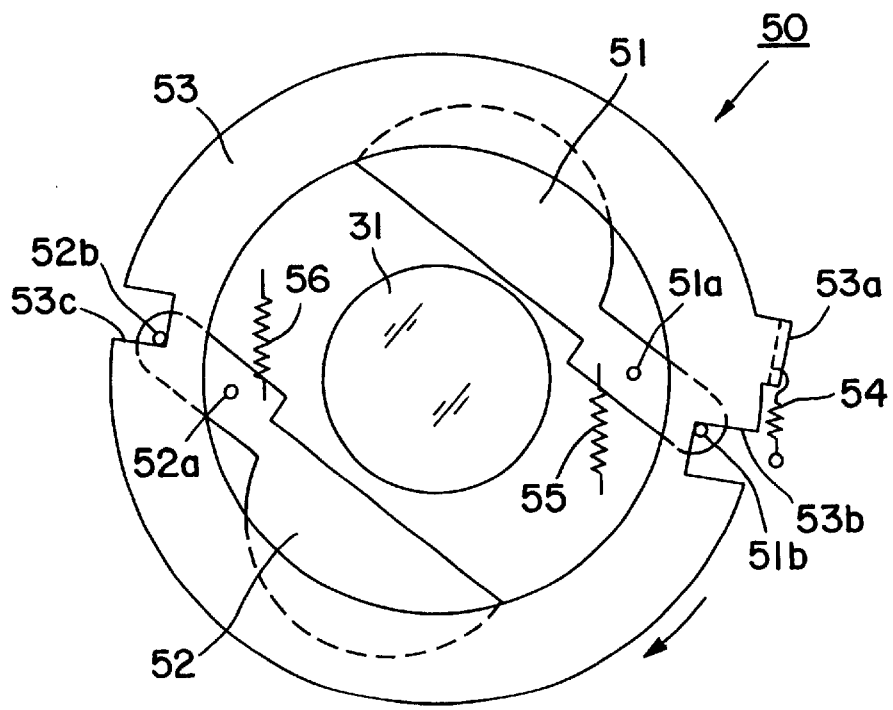
FIG. 11 is a cross sectional view showing the barrier opening and closing mechanism of FIG. 8, enlarged, in an interchangeable lens camera according to a preferred embodiment of the present invention.

Barrier opening and closing mechanism 50 is a lens protection member disposed so as to open and close the photographic light path at the front end of photographic lenses 31, 32 within the lens barrel 30. The barrier opening and closing mechanism 50 includes a pair of barrier vanes 51, 52 which shield the front surface portion of the first lens group 31 at the front surface portion of the lens barrel 30. As shown in FIGS. 8 and 10, the barrier vanes 51, 52 are closed when the lens barrel 30 is detached from the camera, and, as shown in FIGS. 9 and 11, the vanes 51, 52 are open when the lens barrel 30 is mounted in the camera.

As shown in FIGS. 8–11, this kind of barrier mechanism 50 is equipped with a barrier opening and closing drive ring 53. A leg 53a extends from a portion of barrier opening and closing ring 53 in a direction along the outer circumferential portion of the lens barrel 30 towards the rear end side. The leg 53a engages in the engagement portion 43e of the lens side mount 43 when the whole length of the lens barrel 30 is shortest, opposes the urging force of a tension spring 54, and, as shown in FIG. 12, moves upwards in this Figure. In this manner, this barrier opening and closing drive ring 53 rotates the forward portion of the lens barrel 30 to arrive at the state shown in FIGS. 8 and 10, and the barrier vanes 51, 52 close by the action of tension springs 55, 56.

Namely, in a case in which the lens barrel 30 is detached from the camera body 1, the detaching action having been performed after causing the lens to collapse, the whole length of the lens barrel 30 becomes shortest, and due to this the barrier vanes 51, 52 close.

Mounting the lens barrel 30 on the camera body 1 extends the lens barrel 30 to a state in which photography is possible. The engagement of the leg 53a with the lens side mount 4 is removed, and the barrier opening and closing drive ring 53 rotates in a clockwise direction in the Figure due to the tension force of the tension spring 54. Thus, each barrier vane 51, 52 is also extended outside from support shafts 51a, 52a to the fixed portion of the lens barrel 30 located at the action end by engagement pins 51b, 52b. Barrier vanes 51, 52 engage the engagement portions 53b, 53c by the notch of the barrier opening and closing ring 53, and rotate in the opening direction opposing the tension force of the respective tension springs 55, 56 and are thus in the open state as shown in FIGS. 9 and 11.

As shown in FIGS. 1, 8, and 9, lens barrel inside cover 58 is disposed so as to protect the outside of first lens group support frame 33 at the time that the lens barrel 30 is mounted when the lens groups 31, 32 and the like are in the photographic standard stall shown in FIG. 9. Lens barrel inside cover 58 extends from the front end portion of the barrel. At this time, the barrier vanes 51, 52 open.

As shown in FIGS. 8 and 9, in a camera with an interchangeable lens barrel mounted therein, a release button 61 is disposed at the upper end surface in a portion approaching one side in the camera body case 19 which covers the outer surface. Furthermore, a window 62 and a strobe light generation window 63 are disposed side by side at the upper side of an open aperture 19a, at which the lens barrel 30 is mounted. Moreover, a generally known photometric device, rangefinding device, and viewfinder are arranged inside the window 62. Moreover, zoom switches, comprising a zoom up switch ZUS and a zoom down switch ZDS, are disposed in the upper portion of the back surface side of the camera, in order to provide drive control of the zoom lens (by lens groups 31, 32).

In the above construction, as shown in FIGS. 5 and 6, a detection switch 25 is mounted in the detachment knob 20 in order to detect the operating position of the detachment knob 20. Sliding member 26 is disposed on a portion of the detachment knob 20 by brushes. Each brush of the sliding member 26 slides on printed board 27. The operating position of the detachment knob 20 can be detected by the slide contact position of conductive patterns 27a, 27b, 27c formed on the board 27.

Namely, a first position detection switch SW1 is formed by the conductive pattern 27a of the GND side and the conductive pattern 27b, and a second position detection switch SW2 is formed by the conductive pattern 27a of the GND side and the conductive pattern 27c.

Figure 13A:
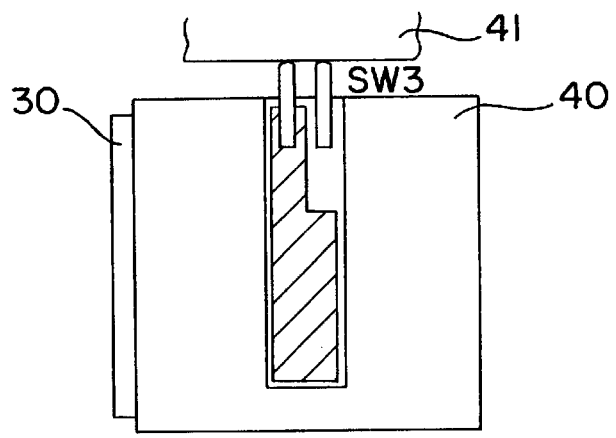

For example the lens barrel 30, from the state shown in FIG. 2 to that shown in FIG. 3, mounting causes a predetermined angular rotation in the body side mount 3 on the camera body 1 side. In this state, the detachment knob 20 operates and moves to position "B" of FIG. 14a as a set state. Thereupon, the light screening plates 14, 15, 16, as described previously, are moved away and open the aperture portion 1a. Further, the body side mount 3 with rotation around the optical axis in the stopped state, moves back and forth along the optical axis. By moving as far as the collapsed position, as shown in FIGS. 1 and 13a, the lens barrel 30 side and camera body 1 side coupling gears 42, 8 are coupled. Moreover, the shutter 35 and electrical signal relay board 44, for focusing drive use, and the connecting pin 9 come into contact when the lens barrel is mounted to the camera body. The state of the camera becomes one where the camera parts can be moved in preparation for photography.

Figure 13B:
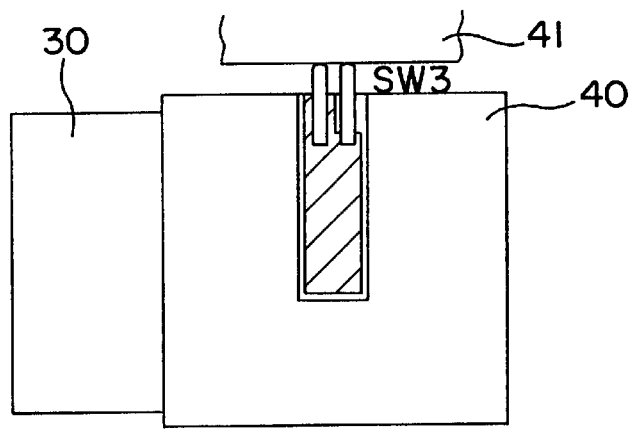

After this, when the detachment knob 20 is operated to the "C" position in FIG. 14a, a zoom drive motor (not shown in the drawing) drives, via the coupling gears 8, 42, the cam tube 40. The cam tube 40 rotates the lens group support frames 32, 33 to extend the lens barrel 30 in the optical axis direction and stops at the Wide end (W end) position. This state is shown in FIG. 4 and FIG. 13b.

At this time, as shown by the double dot chain lines of FIG. 12, the leg 53a of the drive ring 53 undergoes a tension force downwards by spring 54. In this manner, as shown in FIG. 11, the drive ring 53 rotates in a clockwise direction in the Figure. Via engagement pins 51b, 52b of the action end of the barrier vanes 51, 52, the barrier vanes 51, 52 rotate, opposing the tension force of the tension springs 55, 56, around the support shafts 51a, 52a, and open.

As shown in FIG. 14b, by the operation of the detachment knob 20, which also acts as a battery switch and is arranged in the bottom surface portion of the camera, the state becomes as follows. Namely, in the case of position "A", the body side mount 3 is in an extension position in order to detach the lens barrel 30. In the case of position "B", the body side mount 3 retracts within the guide tube 2 of the camera body 1, and the electrical and mechanical coupling with the lens barrel 30 has been completed. In the case of position "C", the power supply switch is ON, and the camera has reached a state in which photography is possible.

Figure 15:
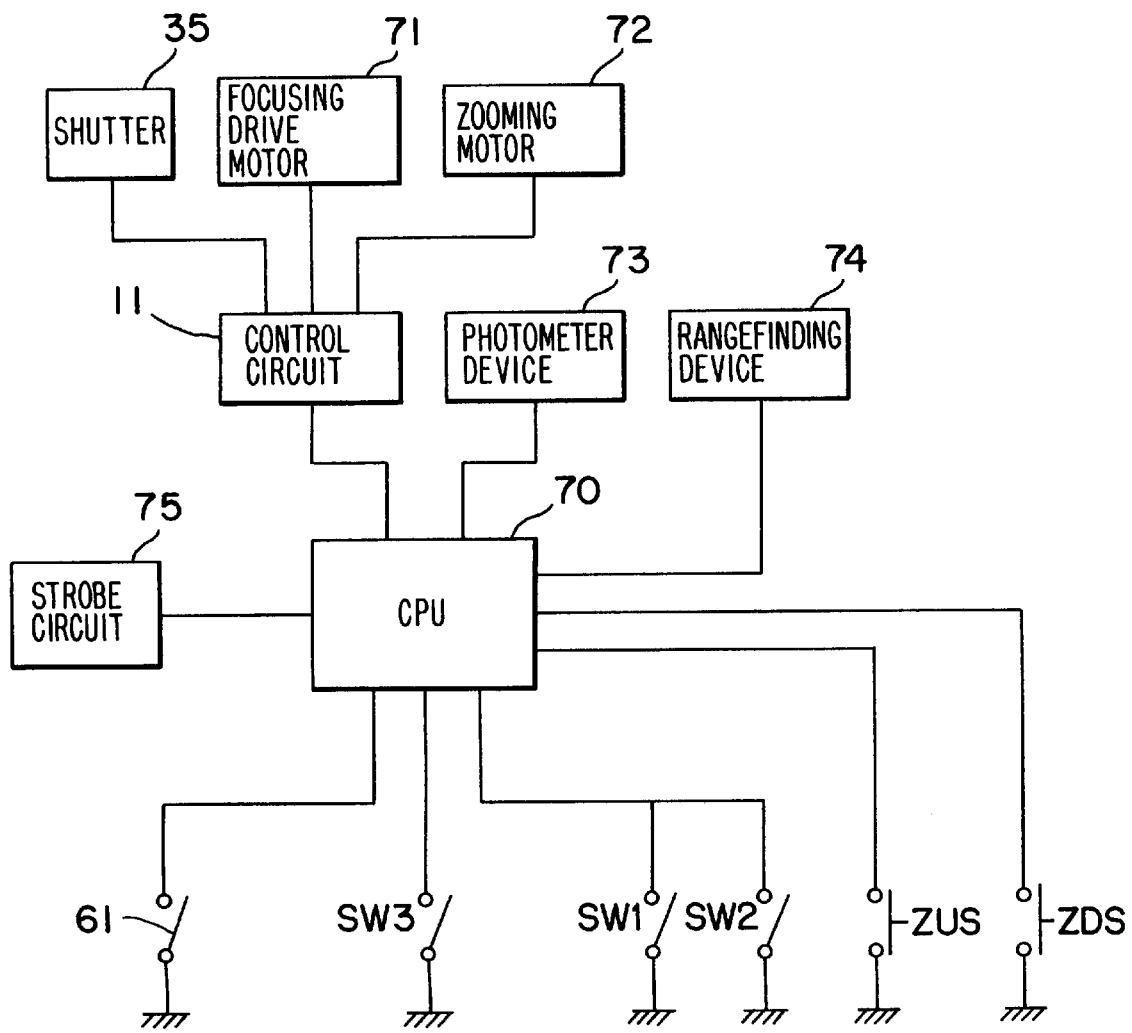
FIG. 15 is a block diagram illustrating a control circuit in an interchangeable lens camera according to a preferred embodiment of the present invention.

Then, the possible positions of the switches 51 and 52 at positions A, B, and C are either ON or OFF. Accordingly, the signal levels from the switches are "H" or "L", as can be confirmed from FIG. 14b. In this manner, by use of the control circuit as shown in FIG. 15, control is performed of the operation of the camera.

FIGS. 7a and 7b show the relationship of the phases of the inclined cam surface 21a in the detachment knob 20 with respect to the cam groove 4a or the set tube 4. When detaching the lens barrel 30, the body side mount 3 moves as far as the guide tube 2 front end portion of the camera body 1 (position shown by A in FIGS. 7a and 7b). At this time, the lens barrel is detached. At this time, the screening device 13 is in a closed state.

By inserting the lens barrel 30 in the optical axis direction into the camera body 1 from the state shown in FIG. 2, and also causing a predetermined angular rotation, as shown in FIG. 3, both mounts 43, 3 are caused to engage. When the detachment knot) 20 is operated in this state, as shown in FIGS. 7a and 7b, the detachment knob 20 may be caused to move to the B position, the C position, and the D position. Thus, the lens barrel 30, because this lens side mount 43 is coupled to the body side mount 3, is retracted into the camera body 1, and the state of the camera becomes the collapsed state shown in FIG. 1.

In the state shown in FIG. 1, by using the zooming motor (shown by symbol 72 in FIG. 15), via the coupling gears 8, 42, the cam tube 40 is rotated, and as shown in FIG. 4, each lens group 31, 32 is driven in the optical axis direction, and photography becomes possible at the required zoom magnification.

Figure 13C:
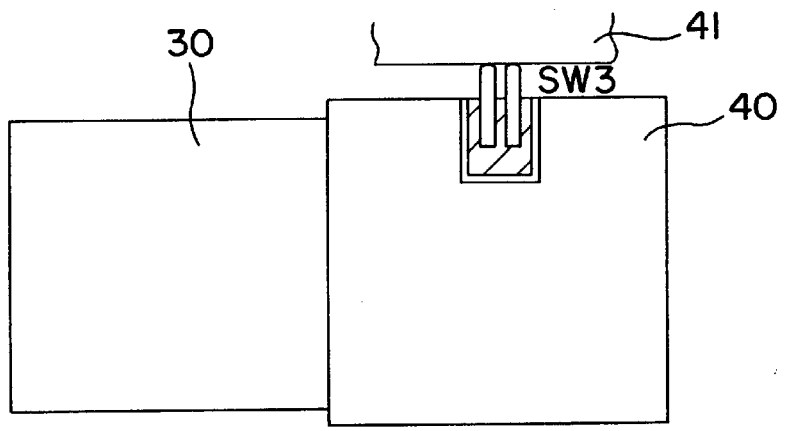

FIGS. 13a, 13b, and 13c show the zoom drive state of the lens barrel 30. FIG. 13a shows the collapsed state, FIG. 13b shows the Wide end state, and FIG. 13c shows the Tele end state. Moreover, the construction is such that movement of the lens barrel 30 in this manner, i.e. zooming, is detected by the zoom position detection switch SW3, which comprises brushes and a conductive pattern. Switch SW3 is interposed between the cam tube 40 and fixed tube 41.

FIG. 15 is a block diagram showing the control circuit in a camera according to a preferred embodiment of the present invention. In FIG. 15, the same or equivalent portions as shown in FIGS. 1–14 are given the same reference symbols, and therefore a further description is omitted.

As shown in FIG. 15, a CPU 70 is disposed in the camera. The shutter 35, focusing drive motor 71, and zooming motor 72 are connected to the control circuit 11. Control circuit 11 in turn is operatively connected to CPU 70. The photometer device 73, rangefinding device 74, and strobe circuit 75 are connected directly to the CPU 70. Moreover, a switch formed by the release button 61, the operating position detection switches SW1, SW2 of the detachment knob 20, the zoom up switch ZUS, and the zoom down switch ZDS are connected to CPU 70. Furthermore, the zoom position detection switch SW3 in the lens barrel 30 as shown in FIG. 13 is connected to CPU 70. The required photographic operation is performed according to the position of each switch.

By an interchangeable lens camera according to the above-described embodiment, the body side mount 3, as the mounting device for detachably mounting the lens barrel 30 in the camera body 1, constitutes a movement device which causes the lens barrel 30 to move back and forth in the optical axis direction. A set tube 4, a coupling gear 8 or connection pin 9 and the like are provided to perform electrical and mechanical transmission at the time when a body side mount 3 has reached a collapsed position of the film surface side. Then, a set tube 4 moves back and forth in the optical axis direction by rotation caused by movement of detachment knob 20 via the engagement of a follower pin 3a and guide groove 2a and cam groove 4a. The lens barrel 30 is received in the camera body 1a body side mount 3 which constitutes a mounting device disposed so as to prevent rotation around the optical axis and also to move back and forth in the optical axis direction.

For example, in the assembled state of the lens barrel with respect to the camera body 1 via the body side mount 3, when the body side mount 3 has retracted to the collapsed position within the camera body 1, the electrical drive members (shutter, focusing drive motor, zooming motor) of the lens barrel 30 side are capable of electrical connection to the control circuit 11 of the camera body side.

According to the above preferred embodiments of the present invention, the camera includes the body side mount 3, which is a mounting device, and which moves linearly along the optical axis direction as far as an operating position (see FIG. 3). Also the shortest length of the interchangeable lens camera is when the lens barrel is detached from the mount 3. At this time, the vanes 51, 52 of barrier opening and closing device 50, which is a lens protection member that opens and closes the photographic optical path at the front surface side of the lens barrel 30, become closed by the engagement of the leg 53a of the barrier opening and closing drive ring 53 and the lens side mount 4.

Moreover, the present invention is not limited to the structure of the above-described embodiments. Suitable changes or modifications can be carried out on the configuration, structure and the like of each part of an interchangeable lens camera, and it goes without saying that various further alternative examples are possible. Essentially, the mounting device constituted with a freely detachable lens barrel 30, prevents rotation about the optical axis within the camera body 1, and also moves back and forth in the optical axis direction.

The interchangeable lens camera, according to the above preferred embodiments of the present invention as described hereinabove, is equipped with a mounting device in order to interchangeably mount a lens barrel in a camera body. This mounting device prevents rotation about the optical axis within the camera body and also moves back and forth in the optical axis direction. Moving this mounting device in the optical axis direction allows for the camera body to receive the lens barrel in the camera body. Moreover, the mounting device, in order to collapse in the camera body, does not come out in the outer part of the camera body. Accordingly, the outer side of the lens barrel can easily be used as a cover, without any restrictions on the design.

Moreover, in accordance with the above preferred embodiments of the present invention, because the mounting device of a lens barrel can be made equal in diameter to that of the lens barrel or smaller, a larger region than that of the diameter of the lens barrel is not required and it is possible to avoid increases in size of the camera. Furthermore, it is possible to completely collapse the lens barrel within the camera body, and because the lens barrel does not project it is more convenient to transport.

Moreover, in the interchangeable lens camera according to the above preferred embodiments of the present invention, the lens barrel, when in a state where the lens barrel has been mounted relative to the camera body via a mounting device, the electrical mechanisms of the lens barrel and the camera body can be reliably connected when the lens barrel reaches the completely collapsed state because the electrical drive member of the lens barrel side can be electrically connected to the control circuit of the camera body side. Likewise, reliable connections can be achieved between the mechanical mechanism units of the lens barrel and camera body.

Moreover, in an interchangeable lens camera according to the above preferred embodiments of the present invention, when the lens barrel is detached from the mounting device, if the camera is operating in a state in which the mounting device is moved in the camera body as far as the extension position along the optical axis, the lens barrel itself is able to freely expand and contract in the optical axis direction. Further, when the lens barrel is detached from the mounting device, thus having the shortest length possible, a lens protection member disposed in the photographic light path closes the photographic light path of the photographic lens front surface side in the lens barrel. As mentioned above, the mounting of the lens barrel to the camera body can be accomplished both simply and accurately, and the lens barrel can be caused to collapse within the camera body by a backward and forward motion in the optical axis direction.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An interchangeable lens camera including a camera body and a lens barrel which is detachable from the camera body, comprising:
    a mounting device to detachably mount the lens barrel on the camera body, the mounting device including a first portion in the lens barrel and a second portion in the camera body to electrically and mechanically connect the lens barrel and the camera body,
    wherein the mounting device moves back and forth within the camera body in an optical axis direction while preventing rotation of the entire lens barrel about the optical axis, and the mounting device receives the lens barrel in the camera body by moving in the optical axis direction.

2. An interchangeable lens camera as claimed in claim 1, wherein the camera body includes electrical mechanism units and mechanical mechanism units, the lens barrel is coupled to the electrical mechanism units and the mechanical mechanism units of the camera body via the mounting device, and the mounting device moves in the optical axis direction to a retracted position within the camera body when the lens barrel is mounted in the mounting device.

3. An interchangeable lens camera as claimed in claim 2, further comprising:
    a control circuit in the camera body,
    wherein the electrical mechanism units are electrically connected to the control circuit when the mounting device reaches the retracted position.

4. An interchangeable lens camera as claimed in claim 1, wherein detachment of the lens barrel from the mounting device is possible in a state in which the mounting device has moved as far as possible to an extended position along the optical axis direction within the camera body.

5. An interchangeable lens camera as claimed in claim 1, wherein the lens barrel expands and contracts freely in the optical axis direction, and wherein the lens barrel is in a state of shortest length in the optical axis direction when the lens barrel is detached from the mounting device.

6. An interchangeable lens camera as claimed in claim 1, wherein the lens barrel includes a photographic lens in the interior of the lens barrel; and a lens protection member to open and close a photographic light path in a front surface side of the photographic lens, wherein the lens protection member is in a position to close the photographic light path when the lens barrel is detached from the mounting device.

7. An interchangeable lens camera, comprising:

a camera body;

a lens barrel with focusing lenses;

a first mounting device disposed in the lens barrel; and a second mounting device disposed in the camera body, and moveable back and forth within the camera body, wherein the first and second mounting devices mount the lens barrel to the camera body and electrically and mechanically connect the lens barrel and the camera body, and wherein the lens barrel is mounted to be non-rotatable and movable along an optical axis of the focusing lenses between a first position where the lens barrel is collapsed within the camera body and a second telephoto position where the lens barrel is extended from the camera body.

8. An interchangeable lens camera as claimed in claim 7, wherein said camera body includes a control circuit that is electrically connected to said lens barrel to control motion of the lens barrel.

9. An interchangeable lens camera as claimed in claim 7, wherein said camera body includes a light screening device having a plurality of light screening plates to block light from falling on a film.

10. An interchangeable lens camera as claimed in claim 7, wherein said lens barrel includes a lens protection member to open and shut a light propagation path through the lenses depending upon a state of the lens barrel.

11. An interchangeable lens camera as claimed in claim 7, wherein said lens barrel includes a shutter to open and close a light propagation path towards a film surface.

12. An interchangeable lens camera comprising:

a mounting structure to interchangeably mount a lens barrel on a camera body, the mounting structure being disposed to prevent rotation about an optical axis while moving back and forth in an optical axis direction, and the mounting structure, by moving in the optical axis direction, receiving the lens barrel in the camera body with a first portion of the mounting structure being disposed on the camera body and being moveable within the camera body and a second portion of the mounting structure being disposed in the lens barrel.

* * * * *